May 25, 1954 — S. FUCCI — 2,679,244
COMBINED BOTTLE WARMER AND HOT PLATE CARRYING CASE
Filed Nov. 28, 1952
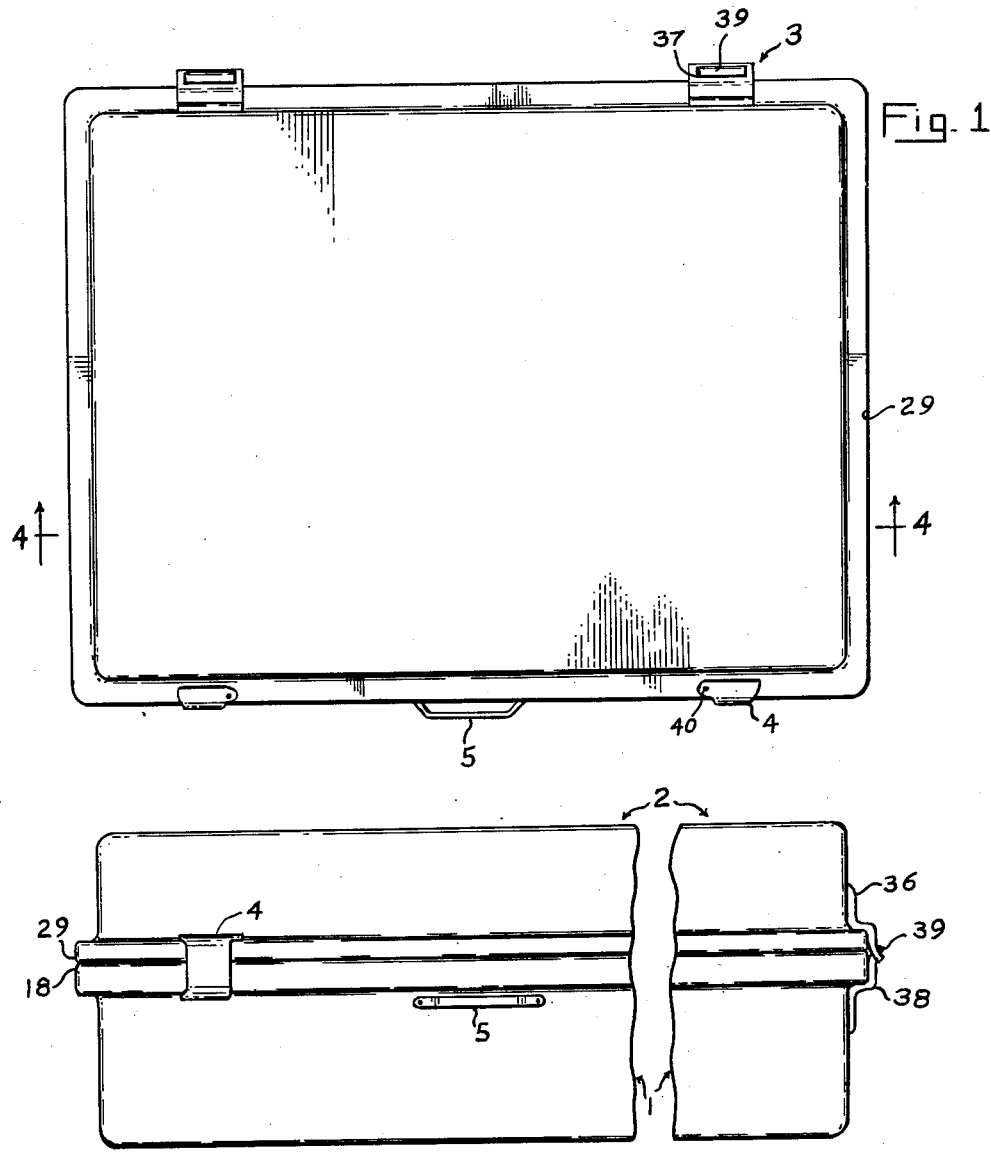
INVENTOR.
SALVATORE FUCCI
BY Nicholas J. Garofolo
ATTORNEY May 25, 1954  S. FUCCI  2,679,244
COMBINED BOTTLE WARMER AND HOT PLATE CARRYING CASE
Filed Nov. 28, 1952  2 Sheets-Sheet 2
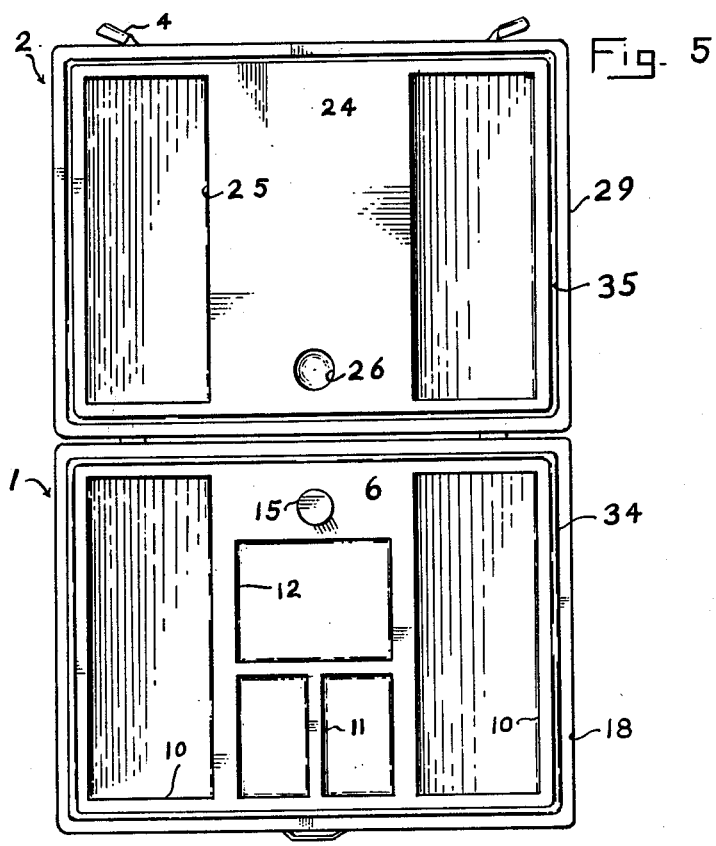
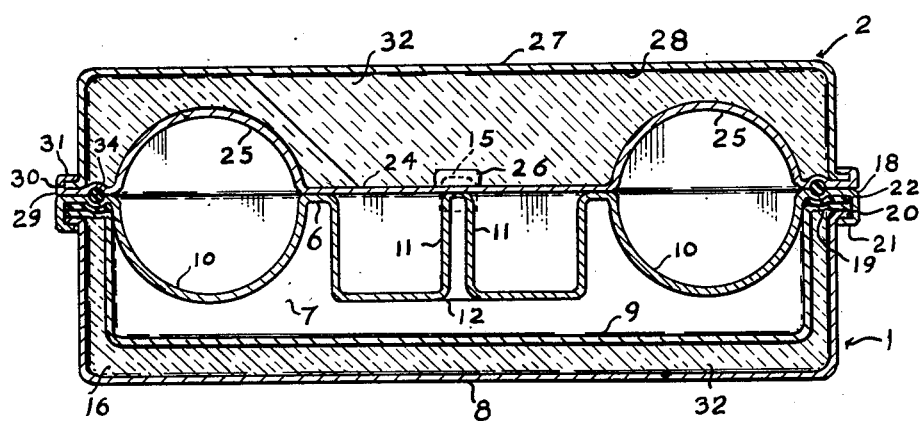
INVENTOR.
SALVATORE FUCCI
BY Nicholas J. Garofalo
ATTORNEY Patented May 25, 1954

2,679,244

UNITED STATES PATENT OFFICE 2,679,244

COMBINED BOTTLE WARMER AND HOT PLATE CARRYING CASE

Salvatore Fucci, Woodside, N. Y.

Application November 28, 1952, Serial No. 323,103

4 Claims. (Cl. 126—261)

This invention relates to new and useful improvements in carrying cases. It is particularly concerned with an insulated carrying case adapted to hold baby foods and nursing bottles and provided with means for keeping the foods and contents of the bottles in a heated condition for considerable periods of time and including a plate for serving the foods.

The invention has many advantages, particularly for the mother visiting or travelling with a child of nursing age. It enables her to carry about a ready hot plate and an adequate supply of nursing bottles and baby foods in a heated condition ready for use when the child's needs arise. It does away with the necessity of heating, as well as the undesirable delay required for heating the baby's food. It provides a handy supply of nourishment in a proper condition ready to satisfy the child's wants the moment it cries.

A general object of the invention is to provide a combined bottle warmer and hot plate carrying case.

Another object of the invention is to provide a carrying case for holding and keeping warm for considerable periods of time a supply of nursing bottles and baby foods.

Another object of the invention is a light weight insulated carrying case for holding and maintaining foods and the contents of bottles in a heated condition suitable for immediate use.

A further object of the invention is a knockdown insulated carrying case adapted to hold and maintain foods in a heated condition for immediate use and having component parts adapted to be utilized as plates from which the foods may be served.

The foregoing objects and advantages of this invention as well as others, will become readily apparent as this specification unfolds in greater detail and as it is read in conjunction with the accompanying drawings forming a material part of this application.

In the drawings wherein a specific embodiment of the invention is illustrated,

Fig. 1 is a plan view of the carrying case with the cover portion uppermost;

Fig. 2 is a front fragmentary elevational view;

Fig. 3 is a fragmentary side elevational view;

Fig. 4 is a cross section taken on the lines 4—4 of Fig. 1; and

Fig. 5 is a plan view of the carrying case in open condition.

In describing the invention in detail reference is directed to the several figures of the drawings wherein there is disclosed a carrying case comprising a lower base receptacle section 1 and a cover section 2 pivoted together at the rear ends thereof by suitable hinges 3, and which sections when closed one upon the other are adapted to be held closed by suitable latches 4. To enable the case to be easily carried about it is provided with a suitable handle 5.

The receptacle section 1 is adapted to contain and hold articles of food and is provided with suitable means for heating as well as keeping the food warm. As shown, particularly in Figs. 4 and 5, the base receptacle includes a panel or plate 6, a fluid compartment or container 7 formed beneath the underside of the plate 6 and an outer bottom panel 8 secured to the receptacle in fixed spaced relation to a wall 9 of the fluid container.

The panel plate 6 is provided with a pair of elongated semi-circular compartments 10 depressed in its surface, one at each end of the plate. It also includes a pair of substantially square depressed compartments 11 and a larger square compartment 12 centrally of its surface. Compartments 11, 12 are adapted to receive and hold articles of food, particularly baby food, preferably contained in bags. Compartments 10 are each adapted to hold and receive a baby nursing bottle of conventional size. The depth of compartment 10 is equal to substantially one half the diameter of a nursing bottle.

The fluid container 7 is formed by the wall 9 secured in fixed spaced relation beneath the panel plate 6 so as to form a pocket adapted to hold a supply of water receivable through an aperture in the upper panel 6. The aperture is provided with a suitable cork 15.

Secured beneath the water container and in fixed spaced relation thereto, as indicated by the space 16, is the outer wall and bottom panel 8 of the receptacle. The several panels 6, 9 and 8 are respectively secured fast to one another in suitable manner. Here, these panels comprising the upper plate 6, the container wall 9 and the bottom wall 8 are each provided with a perimetric flange, respectively flanges 18, 19 and 20. These flanges are superimposed one upon the other in contacting relationship and are held locked together by an extending depending perimetric portion 21 of the upper plate flange 6. This flange 21 extends down and about the two lower flanges 19 and 20 so as to encompass them and is then pressed upwards as in Fig. 4 against the undersurface of flange 20 of the bottom panel, whereby all of the panels are held secured together.

To prevent any possibility of leakage between the flanges of the plate panel and the water container section, a suitable gasket or washer 22 is provided between flanges 18 and 19 of these two sections.

The cover section 2 includes an inner panel plate 24 which has a pair of elongated semi-circular compartments 25 depressed in its surface, one at each end of the plate. Compartments 25 are complementary to compartments 10 of the lower receptacle section 1, and in depth are also equal to substantially one half of the diameter of a nursing bottle, so that when the cover 2 is closed upon the receptacle 1, nursing bottles received in the lower compartments 10 will be contained partly in the receptacle and partly in the cover. The cover panel is further provided with a slight depression 26 adapted to receive the upper extended portion of the cork 15 when the cover is closed down upon the lower base receptacle.

Secured to the underside of panel 24 is an outer panel 27 constituting the top of the cover. A space 28 separates the panel 27 from the inner plate panel 24. The two panels of the cover are securely locked to one another similarly in the manner in which the panels of the receptacle section 1 are held to one another. In this respect the plate and outer panel of the cover are respectively provided with perimetric flanges 29 and 30 superimposed in contacting arrangement one upon the other. Like the panel 6 of the base 1, the flange 29 of the cover plate has a perimetric depending portion 31 which depends about and encompasses the flange 30 of the outer panel and presses up against the underside of the latter so as to securely hold the two panels locked together.

The fluid container is adapted to hold hot water, whereby foods placed in the receptacle will be either warmed or kept warm. When cover 2 is closed down upon receptacle 1, heat from the hot water, as well as from the foods, is prevented from escaping to the outside of the case by suitable insulation of the cover and the base receptacle. To this end the spaces 16 and 28 respectively in the receptacle and cover contain suitable insulation material 32.

So as to allow a desirable and quick transfer of heat from the hot water to foods and bottles contained in the receptacle plate 6, the latter is preferably of metal material, desirably aluminum.

To prevent escape of heat from between the cover and the receptacle when they are closed upon one another, the receptacle plate 6 includes a perimetric groove about its flanged portion 18 in which is suitably held by glue or otherwise a rubber strip projecting up out of the groove a slight extent to provide a perimetric bead 34. A complementary groove 35 contained in the cover flange 29 is adapted to receive and encompass the rubber bead when the cover is closed down upon the receptacle section.

From the foregoing it is plain that the heat of the hot water may be readily conveyed to foods and nursing bottles within the case, and it is also clear that such heat is prevented from being diminished or escaping to the outside of the case by the insulated cover and receptacle as well as by the rubber bead element between the two sections.

The several panels of both sections of the case are fashioned of light weight material, preferably metal, and desirably aluminum.

Suitable hinges 3 affixed to the cover and base receptacle enable the case to pivot to open or closed position. The hinges are preferably of a type that enable the cover to be completely removed from the lower receptacle, so that either the base or the cover may, with respect to the food contained in the case, be used and held as a plate from which a child may be fed. To this end each hinge comprises two separable parts, one an upper plate element 36 secured to the rear wall of the cover and containing an elongated slot 37 in an outwardly extended portion, the other a lower and complementary plate element 38 secured to the rear wall of the base and containing an outwardly extended hook 39 portion. The hook portions are adapted to be removably inserted and contained in the hinge slots. The hinges enable the cover to pivotally open and close upon the lower base section. When it is desired to separate the cover from the base for use as individual plates, the hinge hooks 39 are slipped out of the slots so as to separate the upper and lower portions of the case.

Suitable fasteners or latches, such as the latches 4, each pivoted at 40 to the cover flange 29 at one end, are provided to enable the cover and base to be latched to one another so as to prevent opening of the case while it is being carried.

While I have described and illustrated a specific embodiment of my invention, it is my intent, however, to claim all such forms of the invention as may be reasonably construed to be within the spirit of the invention and within the scope of the appended claims.

I claim:

1. A carrying case comprising a cover section having an inner plate panel and a backing panel insulated from the latter; a base section having an inner plate panel, a second panel in spaced relation to the latter and providing a pocket between the two adapted to hold a supply of hot water, and a backing panel insulated from the second panel, the inner plate panel of the base being of metal adapted to convey heat from the hot water to food articles contained in recesses in the plate panel of the base, the insulated cover and base serving to prevent the loss of heat from the hot water to the outside of the case; a perimetric bead about the marginal surface of the base plate, and a perimetric groove about the marginal surface of the cover plate adapted to receive the bead when the cover is closed down upon the base, whereby heat conveyed to said food articles is prevented from escaping from between the cover and base plate panels; each of the panels of the cover including a perimetric flange in contact with one another, and the flange of the cover inner plate panel including a further portion encompassing the flange of the backing panel, whereby the two panels are locked together; and each of the panels of the base including a perimetric flange in contact with one another, the flange of the base inner plate panel including a further portion encompassing the flanges of the second and backing panels of the base and holding them locked together; hinge means connecting the cover and base sections together for pivotal opening and closing movement of the one with the other; and latch means pivoted at one end to the outer side of the flange of the cover and including a channel portion adapted to engage over the opposing flanges of both the cover and base sections, the latch means serving to hold the groove of the cover section securely down upon the bead of the base section when the cover is closed down upon the base.

2. In a carrying case as set forth in claim 1, wherein the hinges connecting the cover and base sections are composed of separable parts so constructed and arranged that the cover section may be separated from the base section, and upon such separation the latter section may be utilized as a dinner hot plate with respect to any food articles contained in the recesses of the plate panel thereof.

3. In a combined nursing bottle warmer and ready hot plate carrying case, a base section and a cover section pivoted to one another by hinges; the base section comprising a heat conducting plate having depressions each adapted to contain in horizontal position the lower half of a nursing bottle and having other depressions adapted to contain food packets, a second panel secured to the conducting plate at its marginal ends and having its central area in spaced relations to the plate so as to provide a pocket between the two adapted to hold a supply of hot water, and a backing panel joined at its marginal edges to the second panel and having its central area in spaced relation to the latter so as to provide a pocket between the two containing heat insulating material; the cover section including an inner plate panel having depressions each adapted to contain in horizontal position the upper half of a nursing bottle, and a backing panel joined at its marginal edges to the cover plate panel and having its central area in spaced relation thereto and providing a pocket between the two containing insulating material; the inner plate of the base being of metal adapted to convey heat from the hot water to nursing bottles contained in the plate depressions and to heat food contained in the other depressions, and the insulating material of the base and cover sections serving to prevent the loss of heat from the hot water to the outside of the case.

4. In a case as set forth in claim 3, wherein the hinges connecting the cover and base sections together are composed of separable members, so constructed and arranged that the cover section may be separated from the base section and the latter may be used as a hot plate with respect to any food articles contained in the depressions of the plate panel thereof.

References Cited in the file of this patent

UNITED STATES PATENTS

| Number | Name | Date |
|---|---|---|
| 230,274 | Haskell | July 20, 1880 |
| 626,219 | Castle | June 6, 1899 |
| 685,747 | Darrah | Nov. 5, 1901 |
| 1,336,776 | Drinkwater | Apr. 13, 1920 |
| 1,671,547 | Rothera | May 29, 1928 |
| 1,881,873 | Newcomb | Dec. 13, 1929 |
| 1,831,663 | Hill | Nov. 10, 1931 |